United States Patent
Bostick et al.

(10) Patent No.: US 11,668,219 B2
(45) Date of Patent: Jun. 6, 2023

(54) SYSTEM AND METHOD FOR TREATING PROCESS EXHAUST GAS

(71) Applicant: Nooter/Eriksen, Inc., Fenton, MO (US)

(72) Inventors: Glen L. Bostick, Columbia, IL (US); Shaun P. Hennessey, St. Charles, MO (US); Nathan Ross, Ballwin, MO (US)

(73) Assignee: NOOTER/ERIKSEN, INC., Fenton, MO (US)

( * ) Notice: Subject to any disclaimer, the term of this patent is extended or adjusted under 35 U.S.C. 154(b) by 0 days.

(21) Appl. No.: 17/487,887

(22) Filed: Sep. 28, 2021

(65) Prior Publication Data

US 2022/0099012 A1    Mar. 31, 2022

Related U.S. Application Data

(60) Provisional application No. 63/084,290, filed on Sep. 28, 2020.

(51) Int. Cl.
| | |
|---|---|
| *F01N 3/20* | (2006.01) |
| *F01N 5/02* | (2006.01) |
| *F01N 3/28* | (2006.01) |

(52) U.S. Cl.
CPC ......... *F01N 3/2073* (2013.01); *F01N 3/2046* (2013.01); *F01N 3/2889* (2013.01); *F01N 5/02* (2013.01); *F01N 2240/02* (2013.01); *F01N 2610/02* (2013.01)

(58) Field of Classification Search
CPC combination set(s) only.
See application file for complete search history.

(56) References Cited

U.S. PATENT DOCUMENTS

| | | |
|---|---|---|
| 5,352,272 A | 10/1994 | Moll et al. |
| 8,046,989 B2 | 11/2011 | VanderGriend et al. |
| 8,062,617 B2 | 11/2011 | Stakhev et al. |
| 8,166,752 B2 | 5/2012 | Garcia et al. |
| 8,479,501 B2 | 7/2013 | McCarthy, Jr. |
| 9,109,532 B2 * | 8/2015 | Geskes .................. F01K 9/003 |
| 9,512,759 B2 | 12/2016 | Muthaiah et al. |
| 9,915,200 B2 | 3/2018 | Minto et al. |
| 10,107,495 B2 | 10/2018 | Minto |
| 2008/0302519 A1 * | 12/2008 | Franklin .................. F28C 1/14 |
| | | 165/164 |

(Continued)

*Primary Examiner* — Binh Q Tran
(74) *Attorney, Agent, or Firm* — Sandberg Phoenix & von Gontard, PC

(57) ABSTRACT

A system and method for treating turbine exhaust gas includes an industrial process turbine exhaust gas discharge structure, a catalytic turbine exhaust gas treatment device positioned at least partially within the industrial process turbine exhaust gas discharge structure, a pump, and at least two heat exchangers. The catalytic turbine exhaust gas treatment device is positioned at least partially within the industrial process turbine exhaust gas discharge structure. A first heat exchanger is positioned at least partially within the industrial process turbine exhaust gas discharge section structure and upstream of the catalytic turbine exhaust gas treatment device to remove heat from an the turbine exhaust gas by transferring heat to a working fluid. A second heat exchanger removes heat from the working fluid gained at the first heat exchanger. The pump drives the working fluid between the first and second heat exchanger.

41 Claims, 11 Drawing Sheets

(56) References Cited

U.S. PATENT DOCUMENTS

| | | | |
|---|---|---|---|
| 2011/0083426 A1* | 4/2011 | Ikemoto | F01P 7/165 |
| | | | 60/297 |
| 2011/0131962 A1* | 6/2011 | Toi | F01N 5/02 |
| | | | 60/660 |
| 2012/0036850 A1* | 2/2012 | Ernst | F01N 3/035 |
| | | | 60/287 |
| 2014/0352279 A1* | 12/2014 | Gonze | F01N 13/0093 |
| | | | 60/274 |
| 2015/0013328 A1* | 1/2015 | Carstensen | F02B 47/08 |
| | | | 60/597 |
| 2015/0376801 A1 | 12/2015 | Bairamijamal | |
| 2017/0159542 A1* | 6/2017 | Bilancia | F01P 3/20 |
| 2017/0350320 A1 | 12/2017 | Kippel et al. | |
| 2017/0356386 A1* | 12/2017 | Hombsch | F02G 5/02 |
| 2018/0238220 A1 | 8/2018 | Itou et al. | |
| 2019/0276757 A1 | 9/2019 | Liss et al. | |

\* cited by examiner

SYSTEM AND METHOD FOR TREATING PROCESS EXHAUST GAS

CROSS-REFERENCE TO RELATED APPLICATIONS

This application claims the benefit of U.S. Provisional Patent Application Ser. No. 63/084,290, filed Sep. 28, 2020, which is hereby incorporated herein by reference in its entirety.

STATEMENT REGARDING FEDERALLY SPONSORED RESEARCH OR DEVELOPMENT

Not Applicable.

BACKGROUND OF THE DISCLOSURE

Exhaust gasses from a variety of processes and/or combustion of a variety of fuels typically include one or more harmful substances such as carbon monoxide and/or nitrogen oxide. For example, combustion of natural gas or other fossil fuels in power plants generates a hot exhaust gas stream including carbon monoxide, nitrogen oxides, and/or other exhaust gases. Chemical production, hydrocarbon cracking, steel production, and other processes similarly generate a hot exhaust gas stream including harmful substances. Typically, an exhaust gas stream is treated with one or more catalysts (e.g., in a catalyst bed) to mitigate carbon monoxide, nitrogen dioxide, and/or other substances. For example, catalysts can be used to convert nitrogen dioxide and/or carbon monoxide to one or more of water, diatomic nitrogen, carbon dioxide, and/or other less harmful compounds. To treat nitrogen oxides using a catalyst, typically a reactant is used such as anhydrous ammonia or an aqueous solution of ammonia that is introduced upstream of a selective catalytic reaction (SCR) catalyst.

Each catalyst and/or reactant has an operating temperature range that optimizes the desired reaction to mitigate components of the exhaust gas. Additionally, the catalyst or reactant itself and/or the housing (e.g., SCR) or material containing the catalyst and/or reactant can be damaged if the temperature of the exhaust gas exceeds the mechanical/chemical design limits for the catalyst or housing. Therefore, it is sometimes advantageous to controllably reduce the temperature of the exhaust gas prior to passing the exhaust gas into the catalyst materials such that the exhaust gas is within a temperature range for optimum treatment of certain components within the exhaust gas.

Many existing exhaust gas cooling systems and exhaust treatment systems suffer from poor performance, lifespan, efficiency and the like due to the limitations of cooling systems and the requirements of the exhaust treatment systems described above.

SUMMARY OF THE PRESENT DISCLOSURE

The cooling system described in the present disclosure provides several advantages over the typical industrial process turbine exhaust gas treatment system. Through use of disclosed system to cool process turbine exhaust gas, the turbine exhaust gas temperature is controllable to be within the range for treatment with one or more catalysts (e.g., catalyst treatment of carbon monoxide, selective catalytic reduction, SCR, treatment of nitrogen oxides, etc.). Cooling the turbine exhaust allows for the removal of the typical equipment used in treatment, such as forced draft fans, induced draft fans and direct water injection. Exhaust fans are typically energy inefficient and water injection, which has the costs associated with a certain degree of chemical treatment, can lead to formation of undesirable aerosols, premature corrosion of components, and poor performance of the emission catalyst. Preprocessing the turbine exhaust gas to lower the temperature using a system of the type described herein is more energy efficient than using forced draft or induced draft fans generally due to the power consumption associated with moving air (e.g., with a blower, fan, compressor or the like) in comparison to the lesser energy consumption of circulating a liquid (e.g., with a pump) The disclosed system also forgoes the use of direct injection of water into the exhaust and thus removes the potential negative effects of water injection described above. The use of a working fluid as described herein to cool turbine exhaust gas prior to catalytic treatment also allows for greater control over the temperature of the turbine exhaust gas at one or more positions. For example, a working fluid can be used to control the turbine exhaust gas temperature prior to treatment for carbon monoxide at a first location and within a first temperature range, and the temperature of the turbine exhaust gas can be controlled at a second location prior to treatment for nitrous oxides and within a second, different temperature range. Controllability allows for the optimum temperature for different catalytic reactions.

Thus, the controllability provided by the use of a working fluid to cool turbine exhaust gas allows for a decrease in energy consumption in comparison to the use of other techniques (e.g., forced induction fans), and the use of controllable cooling by a working fluid allows for optimization of the catalytic reactions used to treat the turbine exhaust gas. These advantages of the presently described turbine exhaust gas treatment system allow for these and/or other benefits. Use of a working fluid to cool turbine exhaust gas also provides an advantage in that the heat of the turbine exhaust gas can be removed and captured by the working fluid. The energy removed from the turbine exhaust gas can be recovered directly by a mechanical connection to a device such as a pump (e.g., the pump being driven by the working fluid), indirectly using expansion through a suitable device connected to an electrical generator (e.g., the working fluid driving an energy recovery turbine coupled to a generator), or the heat recovered by the working fluid can be used to heat up a separate process fluid (e.g., using a heat exchanger to transfer heat from the working fluid to the separate process fluid). Other benefits and features of the cooling system of the present disclosure will be apparent in view of the disclosed hereinafter.

BRIEF DESCRIPTION OF THE DRAWINGS

Corresponding reference characters and symbols indicate corresponding parts throughout the several views of the drawings.

DETAILED DESCRIPTION

Figure 1:
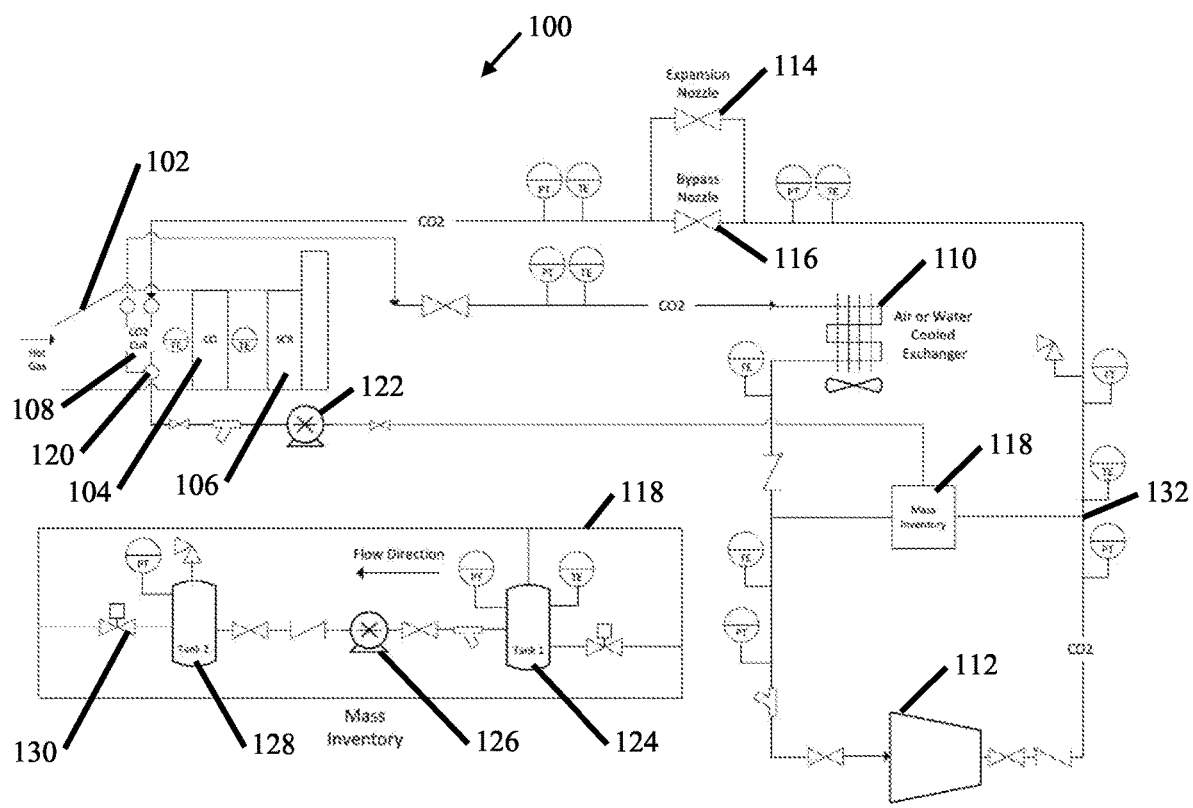
FIG. 1 is a schematic view of an industrial process turbine exhaust gas treatment system including catalytic treatment devices and a carbon dioxide cooling system for cooling turbine exhaust gas, with an expanded view of the mass inventory management system shown to the lower left.

The following detailed description illustrates the claimed industrial process turbine exhaust gas treatment system and associated methods by way of example and not by way of limitation. The description enables one of ordinary skill in the relevant art to which this disclosure pertains to make and use the turbine exhaust gas treatment system. This detailed description describes several embodiments, adaptations, variations, alternatives, and uses of the turbine exhaust gas treatment system, including what is presently believed to be the best mode of implementing the claimed turbine exhaust gas treatment system and associated methods. Additionally, it is to be understood that the disclosed turbine exhaust gas treatment system is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Referring generally to FIGS. 1-8, the industrial process turbine exhaust gas treatment system uses a working fluid to treat turbine exhaust gas. While the exhaust gas treatment system can be considered for any process requiring emissions reduction, one application is related to simple cycle gas turbine facilities. However, exhaust gas resulting from combustion associated with simple cycle gas turbine facilities is only one example of exhaust gas. As used herein, the terms "turbine exhaust gas" and "industrial process turbine exhaust gas" should be understood to be gas from or related to any industrial process such as combustion (e.g., related to power production), chemical production, oil cracking, steel production, or other process that uses or produces as a byproduct a turbine exhaust gas. Referring again to a simple cycle turbine facility, such facilities use only a singular thermodynamic cycle (e.g., Brayton cycle) employed such that the hot exhaust gases from the gas turbine are vented directly to the atmosphere. If emission reductions are required in a simple cycle plant, often large forced draft fans are used to mix large amounts of ambient air with the gas turbine exhaust to achieve the required catalysts operating temperatures. These fans are often expensive to procure and generally have high operating costs (e.g., electrical consumption is high).

The exhaust gas treatment system cools high temperature turbine exhaust gases to optimum temperature ranges to promote the desired chemical reactions that take place to treat exhaust components while simultaneously protecting the catalyst systems from suffering mechanical damage due to overheating. This is achieved without use of large forced draft fans or induced draft fans. No additional atmosphere or other gases need be added to the turbine exhaust gas, for the purpose of cooling the turbine exhaust gasses, before the turbine exhaust gas is treated with one or more catalytic processes. In some embodiments, additional atmosphere or other gases are added indirectly to the turbine exhaust gases, but this is not to cool the turbine exhaust gases but is rather to facilitate the treatment of the turbine exhaust gases. For example, when treating nitrogen oxides of the turbine exhaust gas stream ammonia can be used. In such a case, the ammonia can be aqueous such that the ammonia is mixed with atmospheric air in a mixing tank where the aqueous ammonia is flashed into and diluted with the atmosphere in the mixing tank prior to injection into the turbine exhaust gas.

A heat transfer coil upstream of the catalyst system(s) is used to treat the turbine exhaust gas to reduce the hot gas temperature to targeted ranges for safer and more efficient catalyst operation. The recovered heat removed from the host turbine exhaust gas is dissipated to ambient via air and/or water-cooled heat exchangers. Alternatively, the removed heat can be used to heat up external process streams (e.g., using a heat exchanger), recovered by mechanical application (e.g. the removed heat can drive a pump), or the removed heat can be recovered through direct expansion of the thermal working fluid using a device connected to an electrical generator (e.g., the thermal fluid can be expanded to drive a turbine which in turn drives an electrical generator). Additional heat transfer coils can be positioned within the gas stream to allow different turbine exhaust gas temperatures to be achieved at different points within the turbine exhaust gas stream.

This temperature control allows for improved treatment of the turbine exhaust gas. For example, typically the targeted optimum temperature range for the carbon monoxide treating catalysts does not overlap with the optimum temperature range for the nitrogen oxides treatment reactions. The temperatures for treating carbon monoxide are higher than the temperatures for treating nitrogen oxides. As a result, the carbon monoxide treatment catalyst can operate in a hotter temperature range, below an upper limit, than the SCR catalyst. The use of multiple cooling coils (e.g., heat exchangers) allows for the temperature of the turbine exhaust gas stream to be controlled to improve the effectiveness of the catalytic treatment.

In some embodiments of the industrial process turbine exhaust gas treatment system, the system uses supercritical carbon dioxide as the working fluid. This provides some specific advantages in that supercritical carbon dioxide has a high fluid density making it easy to pump around a closed cooling loop and a high heat capacity such that the system can use a lower amount of fluid passing through the heat exchanger coil for the same temperature reduction of hot turbine exhaust gas. Other suitable heat transfer working fluids including, but not limited to, thermal oils and/or water can be utilized in other embodiments of the turbine exhaust gas treatment system. The system uses cooling loops to cool the turbine exhaust gas stream to be treated. It should be understood that "cooling loop" used herein refers to the equipment used in a refrigeration cycle to provide a cooled working fluid to a heat exchanger to cool the turbine exhaust gas or any other gas to be treated. For example, the cooling loop can include piping, conduits, or the like to contain and allow for the transfer of working fluid; a condenser; a pump; an expansion nozzle; an evaporator; and/or other components (e.g., a shared or dedicated mass inventory system) to provide for a refrigeration cycle for cooling the turbine exhaust gas to be treated. The piping, conduits, or the like provide for fluid communication of the working fluid between the other components of the cooling loop.

Referring now to FIG. 1, one embodiment of the system 100 for treating industrial process turbine exhaust gas using a carbon dioxide working fluid is shown. Exhaust gas to be treated (e.g., from a gas turbine or other process) is received by an industrial process turbine exhaust gas discharge structure 102. The turbine exhaust gas discharge structure 102 is adapted and configured to receive turbine exhaust gas from a source (e.g., gas turbine) and pass the turbine exhaust gas through the industrial process turbine exhaust gas discharge structure 102. For example, the industrial process turbine exhaust gas discharge structure 102 can be hard piped to an a turbine exhaust source and can be or include a pipe, duct, or other structure.

The turbine exhaust gas passing through the industrial process turbine exhaust gas discharge structure 102 passes over/through a catalytic turbine exhaust gas treatment device 104. The catalytic turbine exhaust gas treatment device 104 is positioned at least partially within the industrial process turbine exhaust gas discharge structure 102 such that turbine exhaust gas comes into contact with the catalytic exhaust gas treatment device 104. The catalytic exhaust gas treatment device 104 is adapted and configured to treat at least one component of the turbine exhaust gas through a catalytic reaction between a catalyst contained within the catalytic exhaust gas treatment device 104 and the at least one component of the turbine exhaust gas. For example, the catalytic exhaust gas treatment device 104 contains any suitable agent to react with carbon monoxide to form carbon dioxide. For example, carbon monoxide can be treated using platinum, rhodium, palladium, oxidizers generally, or any other suitable catalyst(s).

The system 100 can further include a second catalytic turbine exhaust gas treatment device 106 positioned within the industrial process turbine exhaust gas discharge structure 102 and downstream of the first catalytic turbine exhaust gas treatment device 104. The second catalytic turbine exhaust gas treatment device 106 is adapted and configured to treat at least one component of the turbine exhaust gas through a catalytic reaction between a catalyst contained within the second catalytic turbine exhaust gas treatment device 106 and the at least one component of the turbine exhaust gas. For example, the second catalytic exhaust gas treatment device 106 contains any suitable agent to react with nitrogen oxides to form one or more of water, diatomic nitrogen, or other compounds. The agent can be or include a reactant such as anhydrous ammonia, an aqueous solution of ammonia, or the like.

In some embodiments, the first catalytic turbine exhaust gas treatment device 104 is adapted and configured to treat both carbon monoxide and nitrogen oxides within the turbine exhaust gas. The first catalytic turbine exhaust gas treatment device 104 can treat both carbon monoxide and nitrogen oxides using multiple catalysts or a single catalyst. For example, in the case of a single catalyst, the first catalytic turbine exhaust gas treatment device 104 can include iron and cobalt impregnated over activated semi-coke. The catalyst is fed with carbon monoxide (e.g., from the turbine exhaust gas) to absorb or otherwise remove nitrogen oxides from the turbine exhaust gas. Other single catalysts can be used to treat both carbon monoxide and nitrogen oxide such as a barium-promoted copper chromite catalyst or any other suitable catalyst.

In order to reduce the temperature of the turbine exhaust gas to within a range suitable for treatment with the catalytic exhaust gas treatment device 104, the system includes a first heat exchanger 108. The first heat exchanger 108 is positioned at least partially within the industrial process turbine exhaust gas discharge section 102 and upstream of the catalytic turbine exhaust gas treatment device 104. The first heat exchanger 108 is adapted and configured to remove heat from turbine exhaust gas passing through the industrial process turbine exhaust gas discharge structure 102 by transferring heat to a working fluid (e.g., carbon dioxide) passing through and within the first heat exchanger 108. The working fluid passes through a cooling loop to continuously (e.g., on demand) provide cooling to the turbine exhaust gas during operation of the system 100 for treating turbine exhaust gas. It should also be understood that the turbine exhaust gas can be cooled for a purpose other than improving the treatment of the turbine exhaust gas (e.g., for the reduction in carbon monoxide and/or nitrogen oxides). For example, the turbine exhaust gas can be cooled to maintain the turbine exhaust gas within a specific temperature range irrespective of a temperature range for treating the turbine exhaust gas. This can allow for processing of the turbine exhaust gas into other products or other uses of the turbine exhaust gas.

Cooled working fluid passes through the first heat exchanger 108 and leaves the first heat exchanger 108 with additional heat. The working fluid leaving the first heat exchanger enters a second heat exchanger 110 positioned downstream of the first heat exchanger 108. The second heat exchanger 110 is adapted and configured to remove heat from the working fluid gained at the first heat exchanger 108. The second heat exchanger 110 can be a condenser that facilitates a phase change of the working fluid from a gas or partial gas exiting the first heat exchanger 108 to at least partially a liquid exiting the second heat exchanger 110. This can facilitate pumping of the working fluid. Alternatively, the second heat exchanger 110 simply removes heat from the working fluid.

In some embodiments, the second heat exchanger 110 is an air-cooled heat exchanger, and in other embodiments the second heat exchanger 110 is a water-cooled heat exchanger. The second heat exchanger 110 can include a fan passing air over the second heat exchanger 110. The second heat exchanger 110 can transfer heat to the atmosphere. In some embodiments, the second heat exchanger 110 can be or include a cooling tower or evaporative cooler.

The working fluid (e.g., carbon dioxide) leaving the second heat exchanger 110 is received at a pump 112 positioned downstream of the second heat exchanger 110. The pump 112 is adapted and configured to drive the working fluid through the cooling loop. The pump 112 can be driven by an electric motor such as a variable frequency drive motor. The pump 112 is adapted and configured to pump supercritical carbon dioxide (or any other applicable fluid). In alternative embodiments (described later with reference to other Figures herein), the working fluid can change phases within the cooling loop and the pump 112 can be adapted and configured to pump a mixed phase working fluid. The pump 112 can compress the working fluid or can simply pump the working fluid.

The pump 112 drives the carbon dioxide working fluid through the cooling loop to an expansion nozzle 114. The expansion nozzle 114 is positioned downstream of the pump 112 and upstream of the first heat exchanger 108. The expansion nozzle 114 is adapted and configured to expand the supercritical carbon dioxide working fluid to reduce the temperature of the working fluid prior to the working fluid entering the first heat exchanger 108. The expansion nozzle 114 can be adapted and configured to change the phase of at least a portion of the working fluid. Alternatively, the expansion nozzle 114 expands the working fluid without the working fluid changing phase. The use of the expansion nozzle 114 reduces the temperature of the working fluid such that a lesser amount of working fluid is needed to achieve a targeted gas temperature at the inlet of the catalytic exhaust gas treatment device 104 (in comparison to a system without an expansion nozzle 114). The reduced temperature allows for use of less working fluid.

The system 100 includes a bypass loop which can include a bypass nozzle 116. The bypass loop (which can include a bypass nozzle 116) is adapted and configured to controllably and selectively permit the working fluid to bypass the expansion nozzle 114. The expansion nozzle 114 can be bypassed using the bypass 116 if sufficient cooling is being provided by the second heat exchanger 110 removing heat from the working fluid. For example, the ambient temperature can be sufficiently low that the second heat exchanger 110 provides sufficient cooling of the turbine exhaust gas. Bypassing the expansion nozzle 114 allows the system 100 to avoid or reduce the pressure drop associated with use of the expansion nozzle 114. Bypassing the expansion nozzle 114 and forgoing the associated pressure drop increases efficiency as the energy required to pump the working fluid is reduced when the pressure is maintained.

In embodiments including a bypass nozzle 116, the bypass is adapted and configured to bypass the expansion nozzle 114 such that the working fluid is expanded by the bypass expansion nozzle 116 instead. The bypass nozzle 116 is adapted and configured to expand the working fluid to a lesser degree than the expansion nozzle 114. Alternatively, the bypass nozzle 116 can expand the working fluid to a greater degree than the expansion nozzle 114 such that the expansion nozzle 114 is bypassed when additional cooling is desired to maintain the exhaust gas temperature within a range suitable for treatment as described herein. In another embodiment, the bypass nozzle 116 can be designed so to minimize or reduce expansion of the fluid passing through the bypass. The bypass valve and the expansion nozzle functionally can be a throttling valve or fixed device, and can be manually or automatically actuated.

The system 100 further includes a mass inventory management system 118. The mass inventory management system 118 is adapted and configured to manage the amount of working fluid within the cooling loop that includes the first heat exchanger 108. The mass inventory management system 118, in order to manage the amount of working fluid in the cooling loop, is adapted and configured to controllably receive working fluid from downstream of the first heat exchanger 108. The mass inventory management system 100 is still further adapted and configured to add or remove working fluid from the cooling loop.

The mass inventory management system 118 controllably removes working fluid from downstream of the first heat exchanger 108 (e.g., using a controllable valve) at a takeoff point 120. Working fluid removed from the cooling loop at the takeoff point 120 passes through a valve to a pump 122. The pump 122 drives the working fluid from the takeoff point 120 to the mass inventory management system 118. The working fluid pumped by the pump 122 passes through a further valve on the way to the mass inventory management system 118.

In the expanded schematic of the inventory management system in FIG. 1, the working fluid is received in a first tank 124 of the mass inventory management system 118. The first tank 124 can store the working fluid and/or can function as a temporary receiving tank. The first tank is drainable by a mass inventory pump 126. The working fluid leaving the first tank 124 passes through a check valve positioned between the first tank 124 and the mass inventory pump 126. The mass inventory pump 126 is controllable to supply a second tank 128 of the mass inventory management system 118 with working fluid. The second tank 128 can operate as storage tank for the working fluid. Working fluid driven by the pump 126 passes through a check valve and/or an additional valve on the way to the second tank 128.

A controllable valve 130 (e.g., the valve can be an open/close discrete valve with a generally fixed flow restriction but also can be an active flow control valve with flow controlling characteristic permitting variable flows) is positioned downstream of the second tank 128 to control the addition of working fluid into the cooling loop. The controllable valve 130 is positioned to discharge working fluid from the mass inventory management system 118 into the cooling loop downstream of the second heat exchanger 110 and upstream of the pump 112. The mass inventory management system 118 is also adapted and configured to controllably receive working fluid from the cooling loop at a second takeoff point 132 positioned downstream of the pump 112 and upstream of the expansion nozzle 114.

Still referring to FIG. 1, the system 100 includes a variety of sensors for use in controlling the pumped flow of working fluid to the first heat exchanger 108, the pump 112, the mass inventory management system 118, or the like. Sensors shown in FIG. 1 with the abbreviation PT are or include a pressure transducer adapted and configured to measure the pressure of the working fluid at that point in the system 100. Sensors shown with the abbreviation TE are or include a temperature element (e.g., a thermocouple, thermistor, or the like) adapted and configured to measure the temperature of the working fluid or the temperature of the turbine exhaust gas in the system 100. Sensors shown with the abbreviation FT are or include a flow transmitter/flow meter (e.g., an anemometer, magnetic flow meter, turbine flow meter, rotameter, spring and piston flow meter, or the like). The system 100 can also employ additional and/or different types of process measurements to control the system and/or provide process conditions for data collection and system optimization.

Using these sensors and controllable devices (e.g., valves), the system 100 is controlled in operation. The system 100 is primarily controlled based on the turbine exhaust gas temperature entering the catalytic turbine exhaust gas treatment device 104 located within the hot turbine exhaust gas stream and within the turbine exhaust gas discharge structure 102. The system can also or alternatively be controlled based on the turbine exhaust gas temperature entering the second catalytic turbine exhaust gas treatment device 106. The set point temperature for the hot turbine exhaust gas temperature at the catalyst face (e.g., at the entrance to the first and/or second catalytic turbine exhaust gas treatment device) is used to modulate the variable frequency drive motor driving the pump 112. This in turn controls the flow rate of the working fluid around the cooling loop with more flow being provided when the turbine exhaust temperature at the catalyst face is hotter than the set point. In alternative embodiments, the pump 112 is not driven by a variable frequency drive motor and instead a flow control valve is positioned downstream of the pump 112. Such a flow control valve is used to control the flowrate of the working fluid through the cooling loop to in turn control the temperature of the turbine exhaust gas.

In some embodiments, the system 100 is controlled by having a flow rate set by controlling the turbine exhaust gas temperature at the face of the catalytic turbine exhaust gas treatment device 104 with the working fluid passing through the bypass valve 116. When the pump flow rate reaches a predetermined level, the flow can be modulated through the bypass valve 116 so as to control the temperature of the turbine exhaust gases at the face of the catalytic turbine exhaust gas treatment device 104.

In embodiments of the system 100 including a heat exchanger utilizing a fan (e.g., the second heat exchanger 110), the sequencing of the fan ON/OFF within the heat exchanger can be used to optimize or reduce power consumption and/or for further temperature control of the working fluid. For example, on colder days it is possible to turn off the fan(s) as the working fluid temperature can be suitably low enough to achieve the desired turbine exhaust gas temperature at the face of the catalyst. Additionally, in some embodiments one or more heat exchangers can be bypassed, in full or in part, and any corresponding fan can be cycled down. Selectively bypassing one or more ambient air heat exchangers allows for further temperature control of the working fluid prior to entering the heat exchanger 108 located in the hot turbine exhaust gas stream. Bypassing one or more ambient air heat exchangers also allows for a reduction in power consumption by the pump 112 due to a lower total pressure drop for the closed working fluid loop flow path.

For applications using CO2 (e.g., system 100 shown in FIG. 1), the mass inventory management system 118 can be operated to maintain the CO2 working fluid in the supercritical state (T>32° C., 77 bar) or in the liquid state throughout the complete working loop. However, it should also be understood that the use of an expansion valve/nozzle 114 can result in a 2-phase fluid including vapor being introduced to the first heat exchanger 108 (e.g., a transfer coil inside the hot gas stream). With CO2 working fluid, the mass inventory management system 118 is controlled based on the temperature at the inlet to the pump 112 and is controlled to manage the pressure at this location by adding or subtracting mass from the closed cooling loop system to ensure that the fluid state at the inlet of the pump 112 is either supercritical (hotter ambient days, typically T>28° C.) or liquid phase (cooler ambient days, typically T<28° C.).

Referring now generally to FIGS. 2-8, different embodiments of the system 100 are shown and are later described. Components shown similarly to those in FIG. 1 are the same or substantially similar unless otherwise described as follows. For example, in FIG. 2 the first heat exchanger 208 is the same as the first heat exchanger 108 described with reference to FIG. 1.

Figure 2:
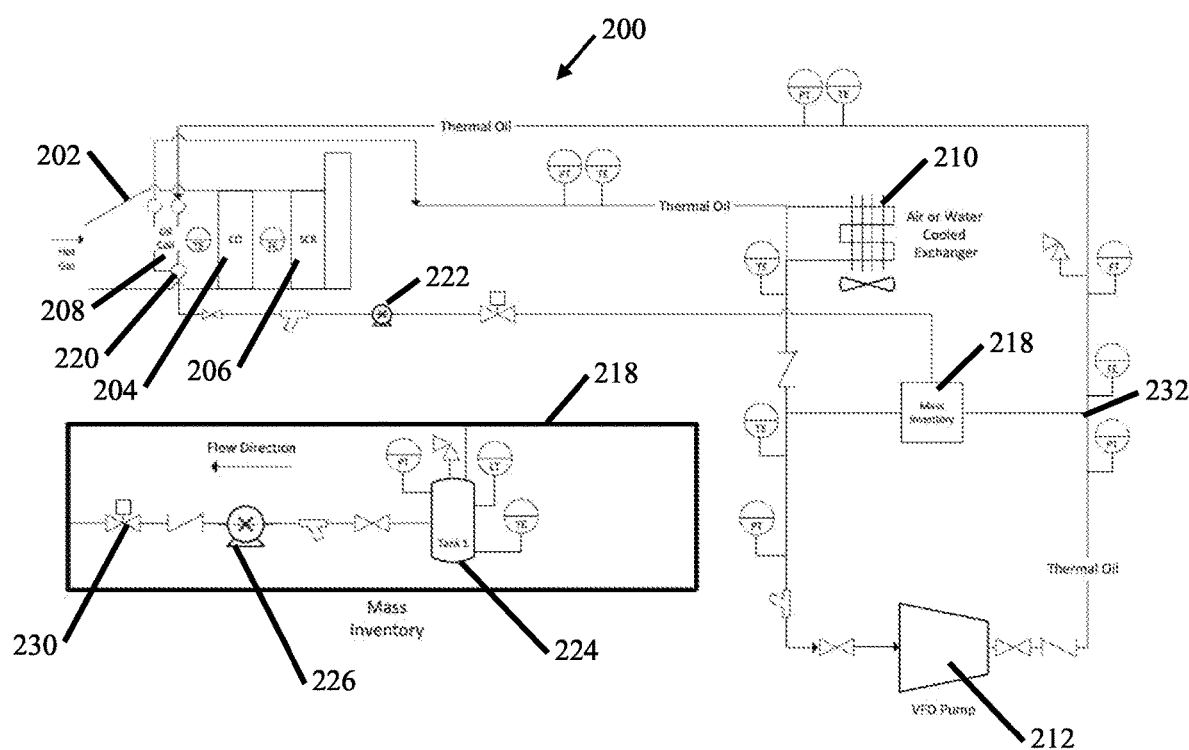
FIG. 2 is a schematic view of an alternative embodiment of the industrial process turbine exhaust gas treatment system of FIG. 1 in which thermal oil is used as the working fluid.

Referring now specifically to FIG. 2, an industrial process turbine exhaust gas treatment system 200 is shown which is a variant of the industrial process turbine exhaust gas treatment system 100 shown in FIG. 1. Instead of using carbon dioxide as a working fluid (e.g., as in the system 100), the system 200 uses thermal oil as the working fluid. The system 200 notably does not include an expansion nozzle and does not include a bypass nozzle. The thermal oil working fluid is not expanded prior to entering the first heat exchanger 208. The system 200 also differs from the system 100 in that the second heat exchanger 210 can be selectively bypassed through control of the system 200.

The system 200 further differs in that the mass inventory management system 218 includes only a single tank 224. The tank 224 is monitored by a level transmitter (LT) and the amount of thermal oil in the cooling loop is controlled to control the system 200 overall as described with reference to FIG. 1.

Figure 3:
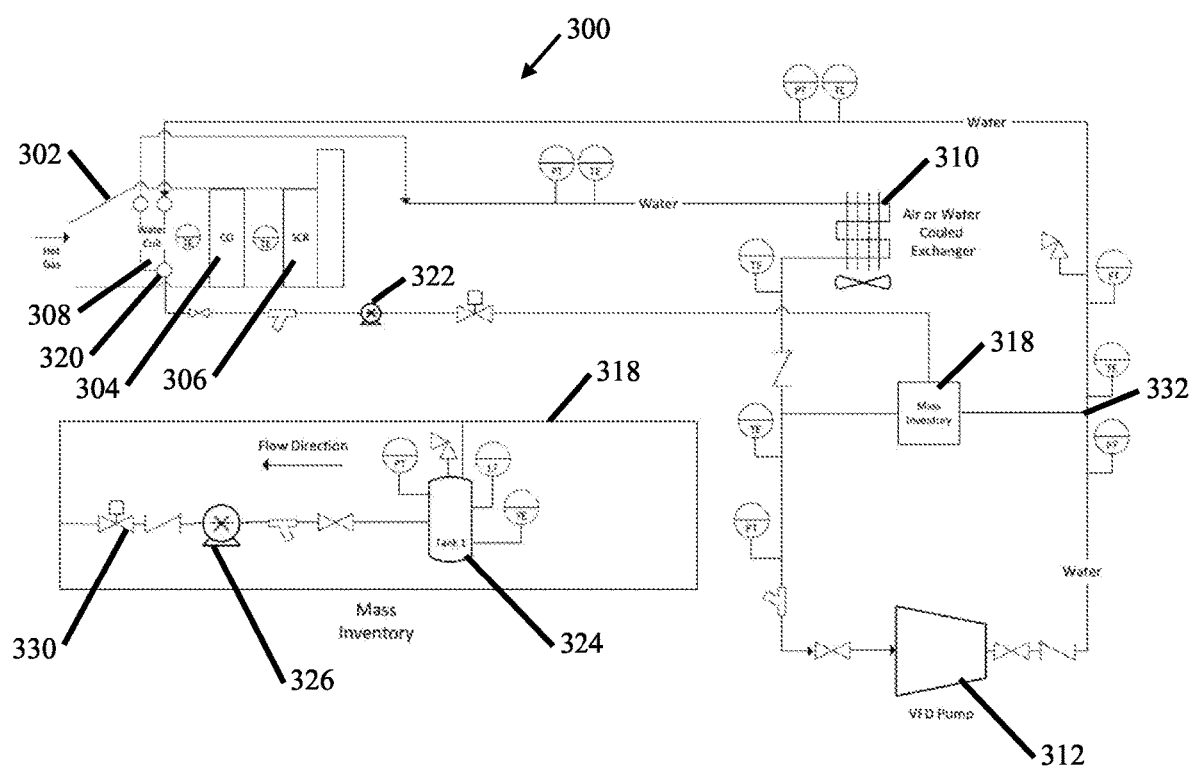
FIG. 3 is a schematic view of an alternative embodiment of the industrial process turbine exhaust gas treatment system of FIG. 1 in which water is used as the working fluid.

Referring now to FIG. 3, an industrial process turbine exhaust gas treatment system 300 is shown which is a variant of the industrial process turbine exhaust gas systems 100, 200 shown in FIGS. 1-2. The industrial process turbine exhaust gas treatment system 300 varies from the industrial process turbine exhaust gas system 200 shown in FIG. 2 in that water is used as the working fluid. The industrial process turbine exhaust gas treatment system 300 further varies in that it does not include a bypass of the second heat exchanger 310.

Figure 4:
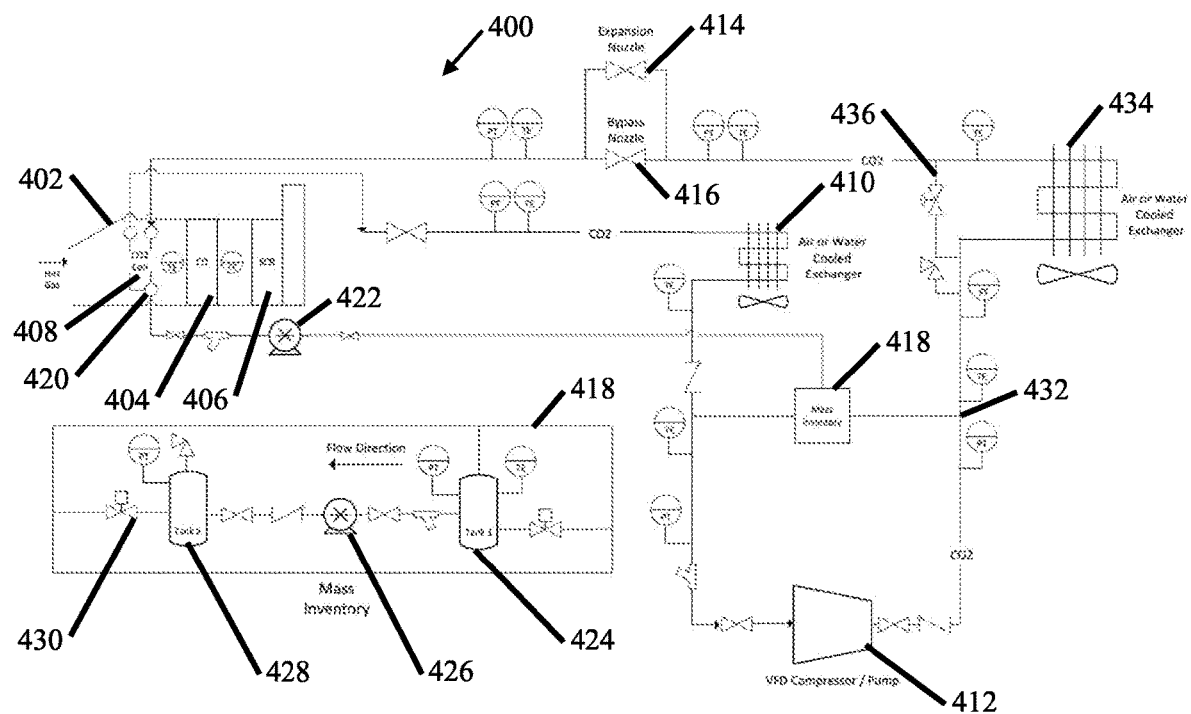
FIG. 4 is a schematic view of an alternative embodiment of the industrial process turbine exhaust gas treatment system of FIG. 1 including a heat exchanger positioned between a pump and an expansion nozzle.

Referring now to FIG. 4, an industrial process turbine exhaust gas treatment system 400 is shown which is a variant of the industrial process turbine exhaust gas system 100 shown in FIG. 1. The industrial process turbine exhaust gas treatment system 400 uses carbon dioxide as a working fluid. The industrial process turbine exhaust gas treatment system 400 differs from the industrial process turbine exhaust gas treatment system 100 in that the industrial process turbine exhaust gas treatment system 400 includes a third heat exchanger 434 and additional sensors associated with the third heat exchanger 434 (e.g., a temperature sensor downstream of the third heat exchanger 434 and upstream of the expansion nozzle 414).

The third heat exchanger 434 is positioned downstream of the pump 412 and is adapted and configured to remove heat from the working fluid. The third heat exchanger 434 is either air cooled or water cooled. The third heat exchanger 434 can include a fan to pass ambient air over/through the third heat exchanger 434 such that heat is moved from the working fluid to the ambient atmosphere. As explained with regard to FIG. 1, the fan is controllable to minimize power consumption while maintaining the temperature of the turbine exhaust gas within suitable ranges for treatment with catalyst-based turbine exhaust gas treatment devices, e.g., one or more SCR devices. For example, the fan can be controlled based on the temperature of the working fluid upstream of the third heat exchanger 434, the temperature of the working fluid downstream of the third heat exchanger 434, and/or the temperature of the turbine exhaust gas prior to the first and/or second catalytic exhaust gas treatment device.

The system 400 also includes a bypass valve 436, which can be manual or actuated, adapted and configured to controllably and selectively permit the working fluid to bypass the third heat exchanger 434. The bypass 436 is controlled based on one or more of the inputs described directly above with respect to the control of the fan of the third heat exchanger 434 and/or other factors as generally described for earlier embodiments. The third heat exchanger 434 can be bypassed or partially bypassed to increase the efficiency of the system 434 through decreased power consumption of the associated fan and/or through a lower total pressure drop in the cooling loop. The third heat exchanger 434 is only bypassed when suitable turbine exhaust gas temperature can be maintained without use of the third heat exchanger 434.

Figure 5:
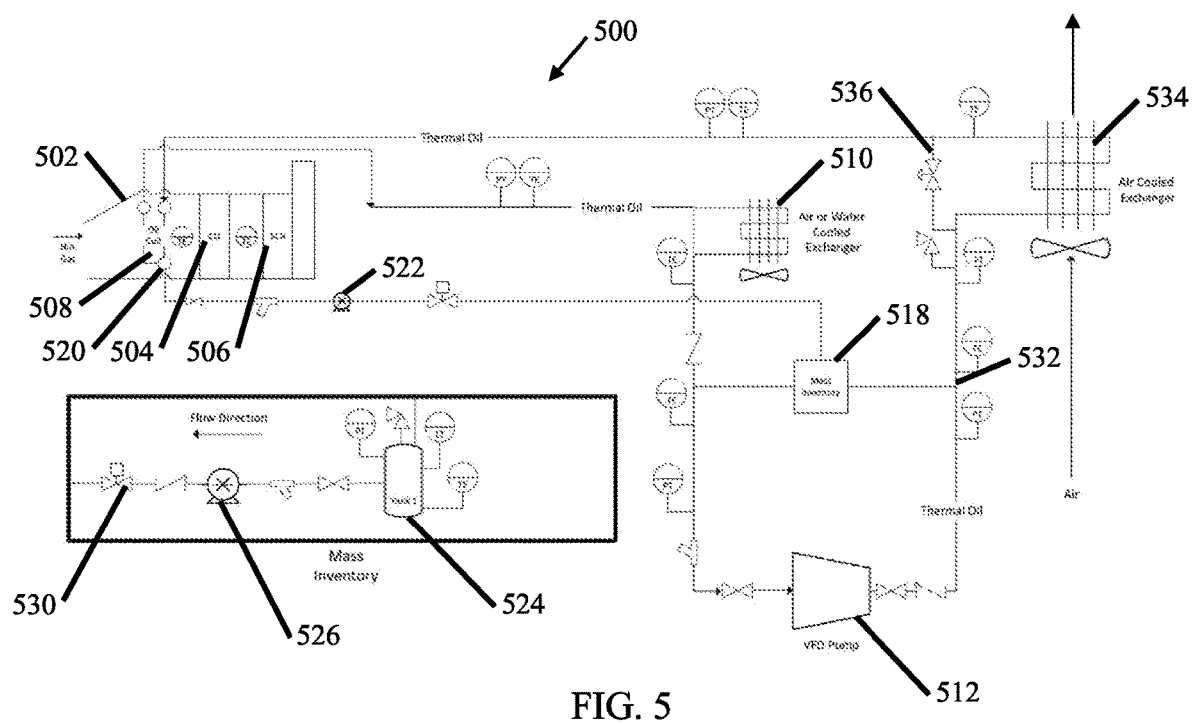
FIG. 5 is a schematic view of an alternative embodiment of the industrial process turbine exhaust gas treatment system of FIG. 4 in which thermal oil is used as the working fluid.

Referring now to FIG. 5, an industrial process turbine exhaust gas treatment system 500 is shown which is a variant of the industrial process turbine exhaust gas system 200 shown in FIG. 2 which includes a third heat exchanger 534 and bypass 536 of the type described with respect to FIG. 4. The industrial process turbine exhaust gas treatment system 500 differs from the system 200 in that it includes the third heat exchanger 534. The industrial process turbine exhaust gas treatment system 500 differs primarily from the system 400 in that the working fluid is thermal oil. The system 500 has the advantages of the system 200 and the system 400 but uses thermal oil instead of carbon dioxide (as in the system 400).

Figure 6:
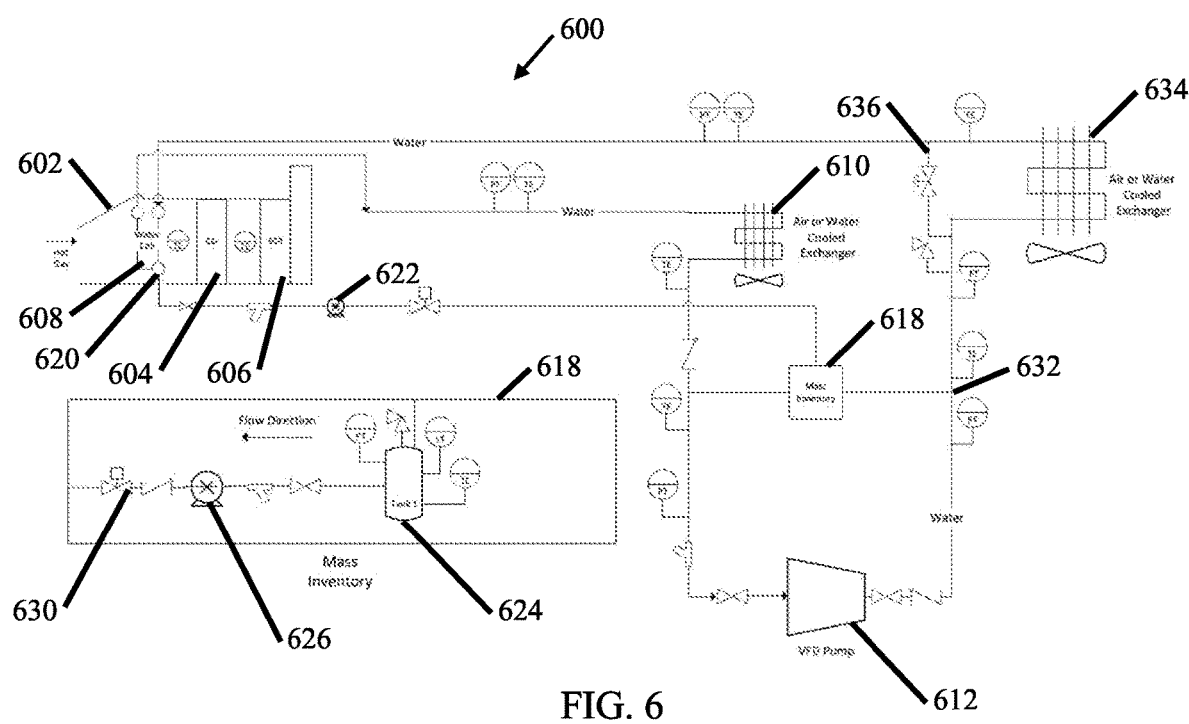
FIG. 6 is a schematic view of an alternative embodiment of the industrial process turbine exhaust gas treatment system of FIG. 4 in which water is used as the working fluid.

Referring now to FIG. 6, an industrial process turbine exhaust gas treatment system 600 is shown which is a variant of the industrial process turbine exhaust gas system 300 shown in FIG. 3 which includes a third heat exchanger 634 and bypass 636 of the type described with respect to FIG. 4. The industrial process turbine exhaust gas treatment system 600 differs from the system 300 in that it includes the third heat exchanger 634. The industrial process turbine exhaust gas treatment system 600 differs primarily from the system 400 in that the working fluid is water. The system 600 has the advantages of the system 300 and the system 400 but uses water instead of carbon dioxide (as in the system 400).

Figure 7:
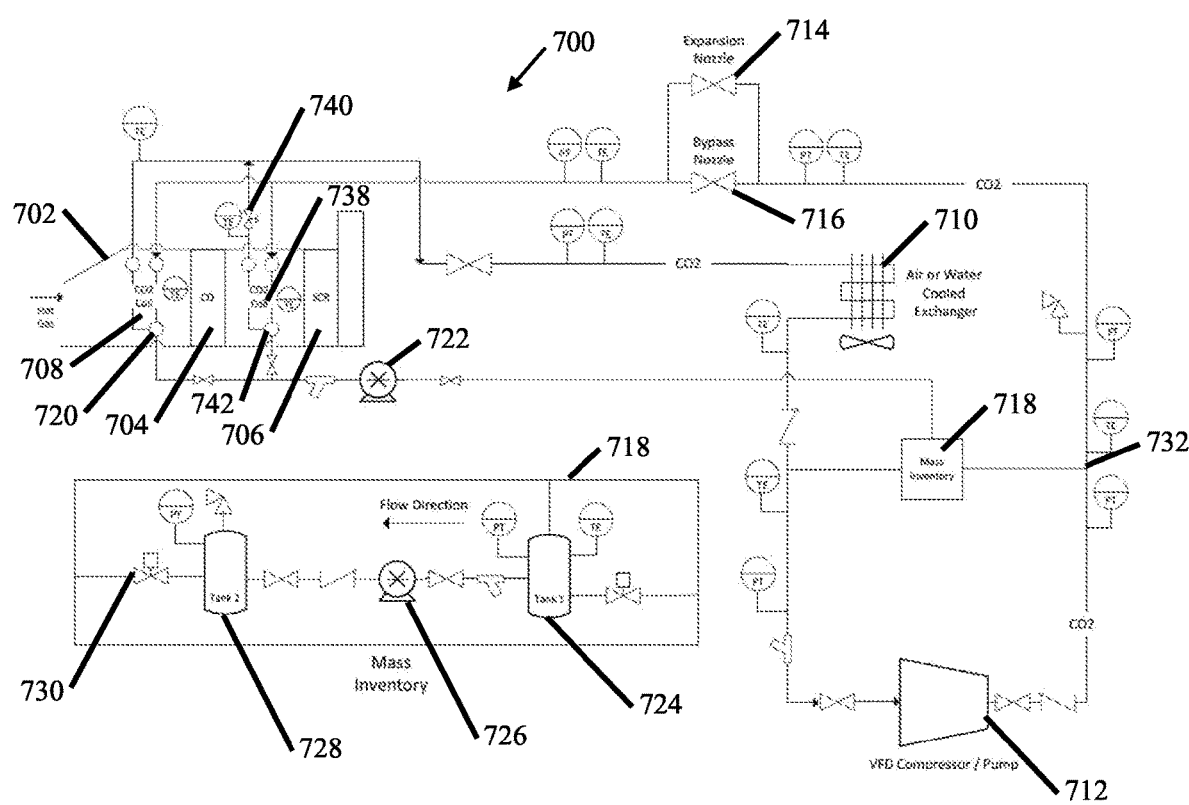
FIG. 7 is a schematic view of an alternative embodiment of the industrial process turbine exhaust gas treatment system of FIG. 1 in which split cooling is used to cool turbine exhaust gas prior to a first catalytic treatment device and to further cool the turbine exhaust gas after the first catalytic treatment device and prior to a second catalytic treatment device.

Referring now to FIG. 7, an industrial process turbine exhaust gas treatment system 700 is shown which is a variant of the industrial process turbine exhaust gas system 100 shown in FIG. 1. The industrial process turbine exhaust gas treatment system 700 differs from the system 100 primarily in that the system 700 includes a fourth heat exchanger 738. The fourth heat exchanger 738 is positioned at least partially within the turbine exhaust gas discharge section 702 downstream of the catalytic exhaust gas treatment device 704. The fourth heat exchanger 738 is also upstream of the second catalytic turbine exhaust gas treatment device 706. The fourth heat exchanger 738 is adapted and configured to remove heat from the turbine exhaust gas passing through the turbine exhaust gas discharge structure 102 by transferring heat to the working fluid (e.g., carbon dioxide) passing through and within the fourth heat exchanger 738. The fourth heat exchanger is positioned within the cooling loop downstream of the pump 712 and upstream of the second heat exchanger 710. The fourth heat exchanger 738 is also downstream of the expansion nozzle 714.

The first heat exchanger 708 and the fourth heat exchanger 738 are arranged in parallel loops such that the working fluid is split, with separate portions of the working fluid passing through the first heat exchanger 708 and the fourth heat exchange 738. The separate portions of the working fluid converge to form a single flow after exiting the first heat exchanger 708 and the fourth heat exchanger 738. The combined output is received by the second heat exchanger 710. The fourth heat exchanger 738 can be adapted and configured to take off from the working fluid prior to the working fluid reaching the first heat exchanger 708 such that the fourth heat exchanger 738 is fed with priority in order to maintain, with priority, an a turbine exhaust gas temperature range within operating parameters of the second catalytic exhaust gas treatment device 706. In other words, the flow of the working fluid can branch upstream of the first heat exchanger 708 and the fourth heat exchanger 738 with a portion of the working fluid being fed to the first heat exchanger 708 and a separate portion of the working fluid being fed to the fourth heat exchanger 738. This allows for separate streams of cooled working fluid to separately supply the two heat exchangers (e.g., in a parallel configuration rather than in a serial configuration where a single stream of working fluid is sequentially heated). The length and configuration of the diverging piping can be adapted and configured to feed the fourth heat exchanger 738 with priority. Alternatively, the exchangers (i.e. 708 and 738) can be in series with the same flow of coolant (e.g. CO2) passing through each exchanger with the flow direction of said fluid being either in parallel to the hot turbine exhaust gas stream or counter current with the turbine exhaust gas stream. In other words, one of either of the two heat exchangers can be fed with priority, the heat exchangers can be fed serially, or the heat exchangers can be fed in parallel.

Advantageously, the use of two heat exchangers independently cooling the turbine exhaust gas prior to different catalytic treatment devices allows for independent control of turbine exhaust gas temperature prior to independent treatment devices. This allows for the turbine exhaust gas temperature to be maintained within a first range for treatment by the first catalytic treatment device 704 (e.g., to treat carbon monoxide). The turbine exhaust gas temperature is independently maintained within a second lower temperature range for treatment by the second catalytic treatment device 706 (e.g., an SCR to treat nitrous oxides).

The fourth heat exchanger 738 and the first heat exchanger 708 can be independently controlled based on the working fluid temperature monitored at the outlet of both the first 708 and fourth heat exchanger 738. Flow of the working fluid to the first 708 and fourth heat exchangers 738 can be controlled via a temperature control valve located in the pipeline dedicated to the coil being controlled (e.g., control valve 740). Two temperature control valves can be used (one per heat exchanger) or a single control valve 740 can be used to control the flowrate of working fluid to the fourth heat exchanger 738 with the remainder of the working fluid being provided to the first heat exchanger 708 positioned downstream of the fourth heat exchanger 738.

The system 700 includes a mass inventory management system 718 adapted and configured to controllably receive working fluid downstream of the fourth heat exchanger 738 (e.g., using a controllable valve) at a takeoff point 742. Otherwise, the mass inventory system 718 operates as previously described.

Figure 8:
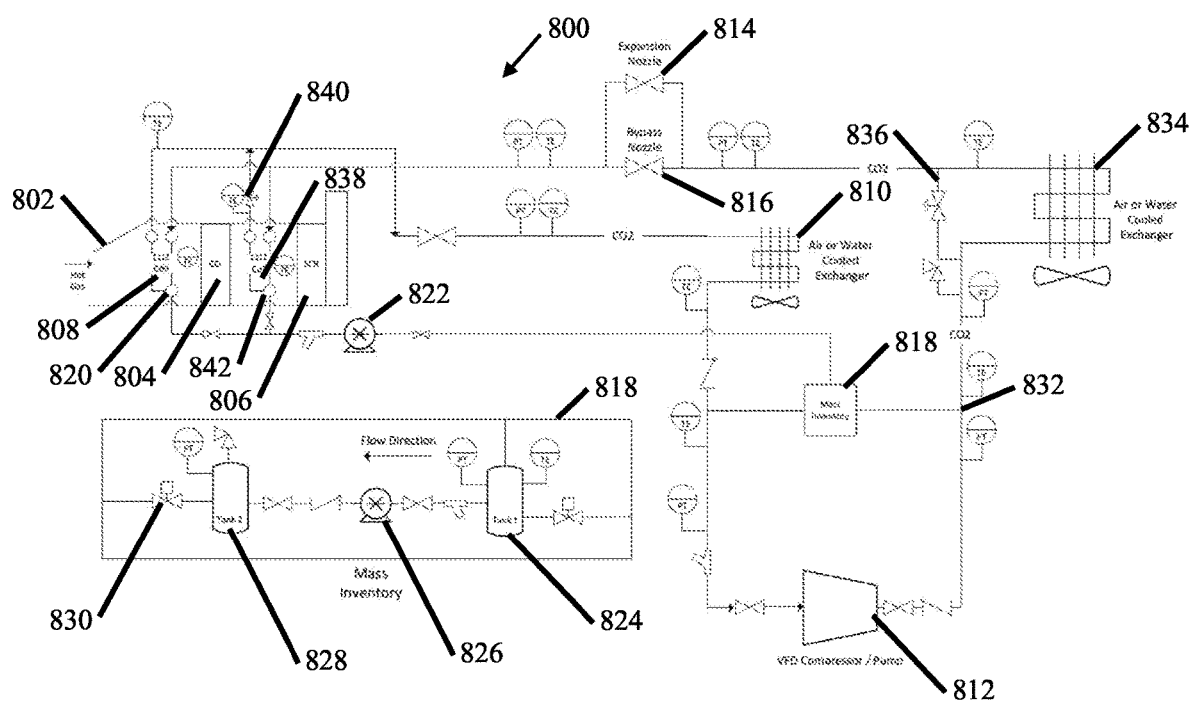
FIG. 8 is a schematic view of an alternative embodiment of the industrial process turbine exhaust gas treatment system of FIG. 7 including a heat exchanger positioned between a pump and an expansion nozzle.

Referring now to FIG. 8, an industrial process turbine exhaust gas treatment system 800 is shown which is a variant of the industrial process turbine exhaust gas system 700 shown in FIG. 7. The industrial process turbine exhaust gas treatment system 800 differs from the system 700 primarily in that the system 800 further includes a third heat exchanger 834 and bypass 836 of the type shown and described with respect to FIG. 4. This system 800 combines the benefits of the fourth heat exchanger 838 and third heat exchanger 834 previously described.

Generally, while the use of a fourth heat exchanger is shown only with respect to FIGS. 7-8, it should be understood that a fourth heat exchanger can be used with any of the systems described herein.

Figure 9A:
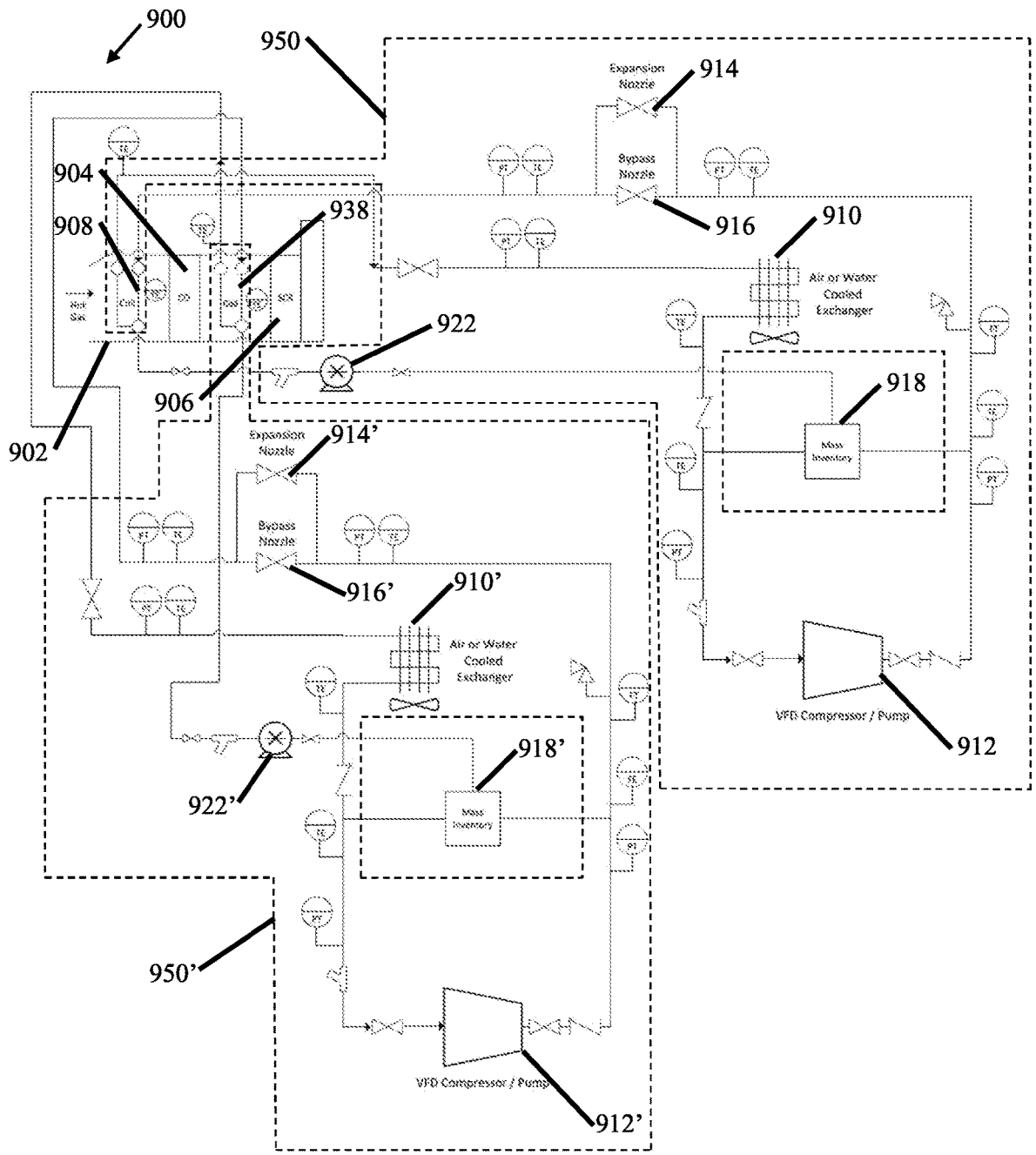
FIG. 9A is a schematic view of an alternative embodiment of the industrial process turbine exhaust gas treatment system having independent cooling loops.
Figure 9B:
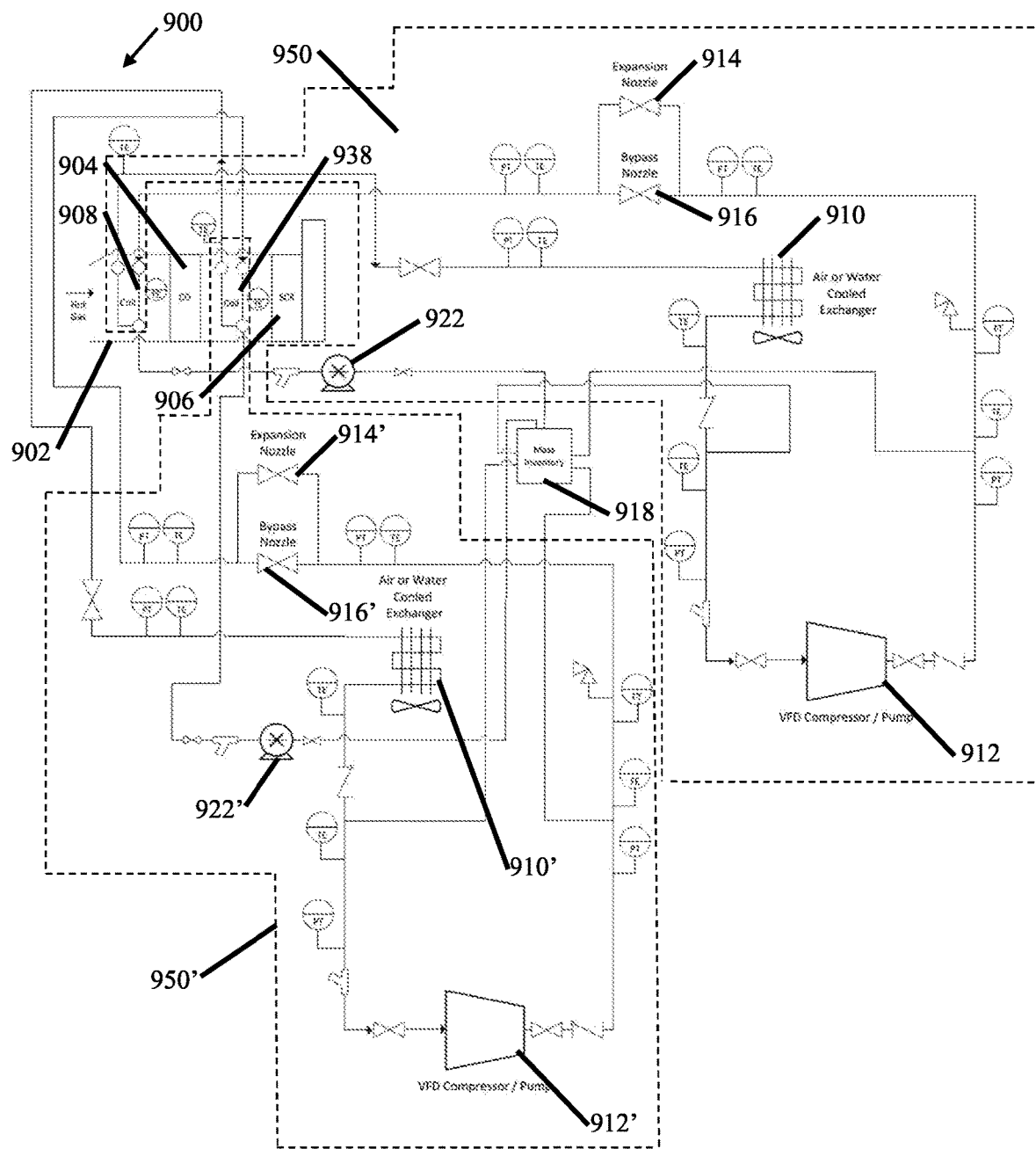
FIG. 9B is a schematic view of an alternative embodiment of the industrial process turbine exhaust gas treatment system having independent cooling loops and a common mass inventory system.
Figure 9C:
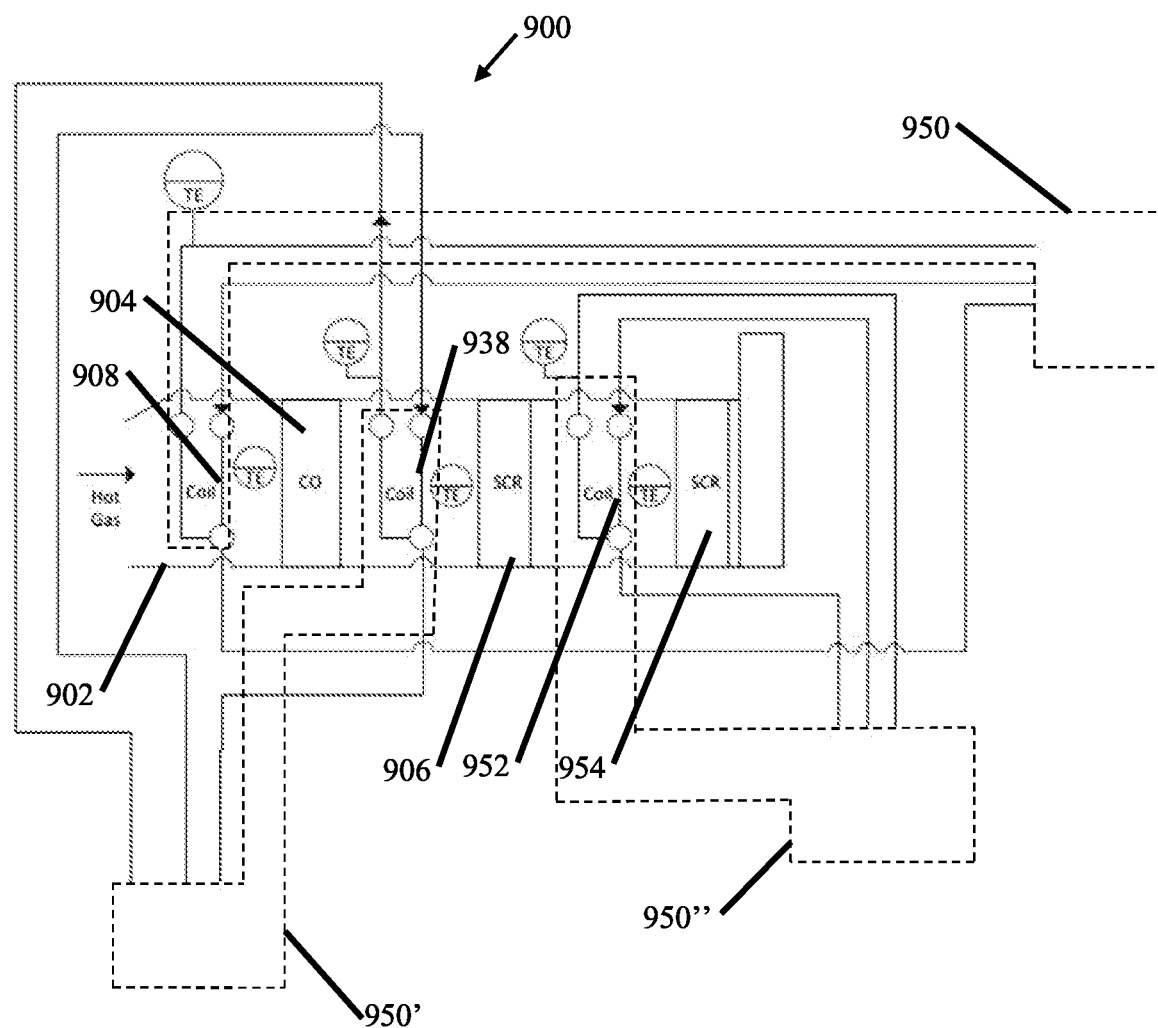
FIG. 9C is a schematic view of an alternative embodiment of the industrial process turbine exhaust gas treatment system having three or more independent cooling loops.

Referring generally to FIGS. 9A-9C, multiple independent cooling loops can be used to cool turbine exhaust gas within the industrial process turbine exhaust gas discharge structure 902. Each independent cooling loop 950, 950', 950" (shown within dashed lines) cools the turbine exhaust gas within the industrial process turbine exhaust gas discharge structure 902 using an independent heat exchanger within the industrial process turbine exhaust gas discharge structure 902. The independent cooling loop 950 cools turbine exhaust gas by supplying cooled working fluid to the first heat exchanger 908, receiving heated working fluid from the first heat exchanger 908, and cooling the heated working fluid prior to supplying it to the first heat exchanger 908. The independent cooling loop 950 further includes piping, conduits, valves, or the like illustrated in solid lines to provide for fluid communication and control of the working fluid between the other components of the cooling loop 950. The independent cooling loop 950' cools the industrial process turbine exhaust gas discharge structure 902. The independent cooling loop 950' cools turbine exhaust gas by supplying cooled working fluid to the fourth heat exchanger 938, receiving heated working fluid from the fourth heat exchanger 938, and cooling the heated working fluid prior to supplying it to the fourth heat exchanger 938. The independent cooling loop 950' further includes piping, conduits, valves, or the like illustrated in solid lines to provide for fluid communication and control of the working fluid between the other components of the cooling loop 950'.

The independent cooling loop 950 comprises at least a second heat exchanger 910 and a pump 912. Similarly, the independent cooling loop 950' comprises at least a second heat exchanger 910' and a pump 912'. Each independent cooling loop 950, 950' likewise includes a heat exchanger (first and fourth heat exchangers 908, 938) positioned within the industrial process turbine exhaust gas discharge structure 902. Each independent cooling loop 950, 950' can include other equipment of the type described herein with respect to any of the embodiments disclosed. For example, each independent cooling loop 950, 950' can include an expansion nozzle 914, 914', a bypass nozzle 916, 916', a mass inventory system 918, 918', a pump 922, 922' adapted to take off and supply the mass inventory system, etc. Each independent cooling loop 950, 950' can also include a third heat exchanger of the type described with respect to FIGS. 4-6 and 8. The mass inventory system 918, 918' can be the type described herein with respect to other embodiments disclosed herein.

It should also be understood that the system 900 including independent cooling loops 950, 950' can utilize any of the working fluids described herein (e.g., carbon dioxide, water, thermal fluid/oil, etc.). The independent cooling loops 950, 950' are independent, with independent mass inventory systems 918, 918', such that the independent cooling loops 950, 950' can use different working fluids. For example, the independent cooling loop 950 can use water as the working fluid, while the independent cooling loop 950' can use carbon dioxide as the working fluid. Any combination of working fluids can be used.

Referring now to FIG. 9B, a system 900 can include independent cooling loops 950, 950' but with a shared mass inventory system 918. This embodiment is substantially similar to that described with respect to FIG. 9A with the substantial difference being that the independent cooling loops 950, 950' share a single mass inventory system 918 and the independent cooling loops are capable of sharing a working fluid. The mass inventory system 918 can be any of the configurations described herein with reference to other embodiments and figures with suitable modifications to provide for double the inputs and outputs to account for two separate cooling loops 950, 950'. The mass inventory system 918 is adapted and configured to allow for the transfer of working fluid between the separate cooling loops 950, 950'.

Referring now to FIG. 9C, the system 900 of the types described herein can include any number of catalytic turbine exhaust gas treatment devices and any number of separate cooling loops 950, 950', and 950". For example, and as depicted in FIG. 9C, the system 900 includes three catalytic turbine exhaust gas treatment devices. A first heat exchanger 908 adapted and configured to cool turbine exhaust within the industrial process turbine exhaust gas discharge structure upstream of the first catalytic turbine exhaust gas treatment device 904 in conjunction with the separate cooling loop 950. A fourth heat exchanger 938 cools turbine exhaust gas upstream of a second catalytic turbine exhaust gas treatment device 906 in conjunction with the separate cooling loop 950'. A sixth heat exchanger 952 cools turbine exhaust gas upstream of a third catalytic turbine exhaust gas treatment device 954 in conjunction with the separate cooling loop 950". In this embodiment, each separate cooling loop 950, 950', 950" includes a distinct mass inventory system and each loop is capable of using a different working fluid. It should be understood that three or more separate cooling loops can be utilized with a single mass inventory system of the type described with reference to FIG. 9B. It should also be understood that three or more catalytic turbine exhaust gas treatment devices can be used in a system with a single cooling loop with parallel branches feeding each separate heat exchanger (e.g., as shown in at least FIG. 7).

Referring generally to FIGS. 1-9C, the systems described herein includes a plurality of heat exchangers described generally. It should be understood that the heat exchangers described herein can be of any suitable configuration. For example, any or all of the heat exchangers can be parallel flow heat exchangers, cross flow heat exchangers, counter flow heat exchangers, or any other suitable heat exchanger.

It should also be understood that the systems described herein include a plurality of catalytic turbine exhaust gas treatment devices. But in alternative embodiments, one or more of the catalytic turbine exhaust gas treatment devices can be substituted with other turbine exhaust gas treatment devices including but not limited to non-catalyst treatment system(s). Non-catalyst treatment systems can comprise a membrane adapted and configured to remove one or more compounds from the turbine exhaust, a urea injection system, or other system. For example, the membrane can be a synthetic membrane made from polymers, cellulose acetate, or ceramic materials. Any suitable material can be used for the membrane, the membrane being adapted and configured to remove carbon monoxide, nitrous oxides, sulfur dioxide, hexane, carbon dioxide, butane, methane, benzene, or other compounds.

Still referring generally to FIGS. 1-9C, the systems described herein provide the benefits described herein of improved turbine exhaust gas treatment. The systems provide increased control over the temperature of turbine exhaust gases such that the turbine exhaust gases can be treated. The systems describe described further provide for increased efficiency through the control of various components of the cooling subsystem used in cooling the turbine exhaust gas for treatment. Further, the systems described herein utilize a working fluid cooling system and corresponding techniques (e.g., such as refrigeration or other general cooling methods) such that the systems do not use or include a forced draft fan to mix air with the turbine exhaust gas nor does the system need to inject water into the hot turbine exhaust gas stream. This increases efficiency by eliminating the power consumption associated with a forced draft fan as well as reducing the negative effects which can occur as a result of water injection (e.g., corrosion). Similarly, the systems described do not use or include an induced draft fan. These fans are unnecessary as additional upstream air is not required to cool the turbine exhaust gas due to the use of the cooling system described herein. The systems described herein further allow for the turbine exhaust gas, once treated, to be exhausted directly to atmosphere.

Further advantages of the systems described herein include the following. The systems described herein can eliminate the need for, or reduce the complexity of, flow conditioning devices in the turbine exhaust gas stream, which are often required to ensure good hot turbine exhaust gas flow distribution at the face of the catalyst systems. These flow distribution devices are subject to high turbine exhaust gas temperature and very turbulent turbine exhaust gas flows resulting in a high cost to supply/install due to the requirements of operation. The systems described herein can eliminate or reduce these flow distribution devices as a result of the turbine exhaust gas being more controllably cooled and/or as a result of the elimination of any dilution air. In other words, flow distribution devices are not needed to adequately mix dilution air with the turbine exhaust gas as the described systems do not use dilution air. Further or alternatively, the heat exchangers positioned within the industrial process turbine exhaust gas discharge structure can adequately distribute flow of the turbine exhaust gas.

It should also be understood that while the systems described transfer heat from the turbine exhaust gas to atmosphere, it is contemplated that such heat can instead be recovered and used for other heating applications and/or power generation. The heated working fluid can heat other process fluids through a heat exchanger. The heated working fluid can drive a mechanical device (e.g., a pump). Further, the heated working fluid can be expanded to drive a turbine which in turn drives an electrical generator.

Further, the use of $CO_2$, specifically, results in lower pumping power required and provides an inert fluid such that the systems described do not need to consider potential hazardous operation that might be required with other fluids (e.g. thermal oils) or corrosive conditions that can occur with the use of still other fluids (e.g. water). The use of $CO_2$ also eliminates the need for the facility to have to remove the fluid from the system during periods when not in operation while freezing conditions exist or from having to provide costly (capital and operating) heat trace equipment to prevent freezing (e.g. systems using water for medium) or sludging (oil systems). A stack damper typically required to reduce air flow through the gas path during freezing conditions is also not used by the described systems.

As various changes could be made in the above constructions and methods without departing from the broad scope of the disclosure, it is intended that all matter contained in the above description or shown in the accompanying drawings shall be interpreted as illustrative and not in a limiting sense.

The invention claimed is:

1. A system for treating turbine exhaust gas comprising:
an exhaust gas discharge structure adapted and configured to receive exhaust gas from an industrial process turbine and pass the exhaust gas through the exhaust gas discharge structure;
a catalytic exhaust gas treatment device positioned at least partially within the exhaust gas discharge structure, the catalytic exhaust gas treatment device adapted and configured to treat at least one component of the turbine exhaust gas through a catalytic reaction between a catalyst contained within the catalytic exhaust gas treatment device and the at least one component of the exhaust gas;
a first heat exchanger positioned at least partially within the exhaust gas discharge structure and upstream of the catalytic exhaust gas treatment device, the first heat exchanger adapted and configured to remove heat from an exhaust gas passing through the exhaust gas discharge structure by transferring heat to a working fluid passing through and within the first heat exchanger, the working fluid passing through a cooling loop to continuously provide cooling to the exhaust gas during operation of the system for treating exhaust gas, the first heat exchanger being a part of the cooling loop;
a second heat exchanger positioned downstream of the first heat exchanger and being in fluid communication with the first heat exchanger, the second heat exchanger adapted and configured to remove heat from the working fluid gained at the first heat exchanger, the second heat exchanger being a part of the cooling loop positioned outside the exhaust gas discharge structure and outside the exhaust gas passing through the exhaust gas discharge structure; and
a pump positioned downstream of the second heat exchanger and being in fluid communication with the second heat exchanger, the pump adapted and configured to drive the working fluid through the cooling loop, the pump being a part of the cooling loop.

2. The system claim 1 further comprising the catalytic exhaust gas treatment device being a first catalytic exhaust gas treatment device, and a second catalytic exhaust gas treatment device positioned at least partially within the exhaust gas discharge structure and downstream of the first catalytic exhaust gas treatment device, the second catalytic exhaust gas treatment device adapted and configured to treat at least one component of the exhaust gas through a catalytic reaction between a catalyst contained within the second catalytic exhaust gas treatment device and the at least one component of the exhaust gas.

3. The system of claim 2, wherein the second catalytic exhaust gas treatment device is adapted and configured to utilize at least one of a different catalyst or a different reactant from the first catalytic exhaust gas treatment device.

4. The system of claim 2, wherein the first catalytic exhaust gas treatment device is adapted and configured to treat exhaust gas within a first temperature range and wherein the second catalytic exhaust gas treatment device is adapted and configured to treat exhaust gas within a second temperature range, an upper bound of the first temperature range being higher than an upper bound of the second temperature range.

5. The system of claim 2, wherein the system is adapted and configured to control a temperature of the exhaust gas downstream of the first heat exchanger such that the exhaust gas downstream of the first heat exchanger is maintained within a temperature range irrespective of temperature ranges for treating the exhaust gas.

6. The system of claim 1, wherein the second heat exchanger is a condenser that facilitates a phase change of the working fluid from a gas exiting the first heat exchanger to at least partially a liquid exiting the second heat exchanger.

7. The system of claim 2 further comprising a third heat exchanger, the third heat exchanger positioned downstream of the pump and adapted and configured to remove heat from the working fluid.

8. The system of claim 7 further comprising a bypass adapted and configured to controllably and selectively permit the working fluid to bypass the third heat exchanger.

9. The system of claim 7, wherein the third heat exchanger is adapted and configured to transfer heat to atmosphere by a fan capable of passing air over the third heat exchanger.

10. The system of claim 1 further comprising an expansion nozzle positioned downstream of the pump and upstream of the first heat exchanger, the expansion nozzle adapted and configured to expand the working fluid to reduce the temperature of the working fluid prior to the working fluid entering the first heat exchanger.

11. The system of claim 10 further comprising a bypass expansion nozzle adapted and configured to selectively bypass the expansion nozzle such that at least a portion of the working fluid is expanded by the bypass expansion nozzle rather than by the expansion nozzle.

12. The system of claim 11, wherein the bypass expansion nozzle is adapted and configured to expand the working fluid to a greater degree or a lesser degree than the expansion nozzle.

13. The system of claim 7 further comprising a fourth heat exchanger, the fourth heat exchanger positioned at least partially within the exhaust gas discharge structure downstream of the first catalytic exhaust gas treatment device, and upstream of the second catalytic exhaust gas treatment device, the fourth heat exchanger adapted and configured to remove heat from an exhaust gas passing through the exhaust gas discharge structure by transferring heat to the working fluid passing through and within the fourth heat exchanger, wherein the fourth heat exchanger is positioned within the cooling loop downstream of the pump and upstream of the second heat exchanger.

14. The system of claim 13, wherein the first heat exchanger and the fourth heat exchanger are arranged in parallel loops such that the working fluid is split with separate portions of the working fluid passing through the first heat exchanger and the fourth heat exchanger, the separate portions of the working fluid converging to form a single flow after exiting the first heat exchanger and the fourth heat exchanger.

15. The system of claim 13, wherein the first heat exchanger and the fourth heat exchanger are arranged to be fed by the working fluid in series, the working fluid not being split between the first and fourth heat exchangers.

16. The system of claim 13, wherein the fourth heat exchanger is adapted and configured to be fed with a portion of the working fluid split from a single working fluid flow prior to the working fluid reaching the first heat exchanger such that the fourth heat exchanger is fed with priority in order to maintain with priority an exhaust gas temperature range within operating parameters of the second catalytic exhaust gas treatment device.

17. The system of claim 13, wherein the first heat exchanger and the fourth heat exchanger are controlled independently to cool the exhaust gas entering the first catalytic exhaust gas treatment device and the second catalytic exhaust gas treatment device, respectively, to different temperature ranges, each temperature range being suitable for different catalysts used in the first and second catalytic exhaust gas treatment devices.

18. The system of claim 1 further comprising a mass inventory management system adapted and configured to manage the amount of working fluid within the cooling loop including the first heat exchanger, the mass inventory management system adapted and configured to controllably receive working fluid from downstream of the first heat exchanger, and the mass inventory management system adapted and configured to add or remove working fluid from the cooling loop.

19. The system of claim 18, wherein the mass inventory management system is adapted and configured to controllably provide working fluid to the cooling loop at a point downstream of the pump.

20. The system of claim 1, wherein the working fluid is carbon dioxide, water, an organic fluid, or thermal oil.

21. The system of claim 1, wherein the system does not include one or more of a forced draft fan to mix air with the exhaust gas, an induced draft fan to mix air with the exhaust gas, exhaust gas diluted with additional air upstream of the catalytic exhaust gas treatment device for the purposes of cooling the exhaust gas, or exhaust gas diluted with additional air upstream of the second catalytic exhaust gas treatment device for the purposes of cooling the exhaust gas.

22. The system of claim 13 further comprising a heat recovery system adapted and configured to use heat transferred into the working fluid from the exhaust gas to power a machine, electrical generator, or heat a further fluid.

23. The system of claim 22, wherein the heat recovery system includes a fifth heat exchanger adapted and configured to remove heat from the working fluid and transfer heat into a separate fluid or gas stream, wherein the heat recovery system further includes a turbine driven by expansion of the working fluid heated by the exhaust gas, and wherein the turbine, driven by expansion of the exhaust gas, itself drives one or more of a mechanical pump, mechanical fan, or electrical generator.

24. A system for treating turbine exhaust gas comprising:
an exhaust gas discharge structure adapted and configured to receive exhaust gas from an industrial process turbine and pass the exhaust gas through the exhaust gas discharge structure;
a catalytic exhaust gas treatment device positioned at least partially within the exhaust gas discharge structure, the catalytic exhaust gas treatment device adapted and configured to treat at least one component of the turbine exhaust gas through a catalytic reaction between a catalyst contained within the catalytic exhaust gas treatment device and the at least one component of the exhaust gas;
a first heat exchanger positioned at least partially within the exhaust gas discharge structure and upstream of the catalytic exhaust gas treatment device, the first heat exchanger adapted and configured to remove heat from an exhaust gas passing through the exhaust gas discharge structure by transferring heat to a working fluid passing through and within the first heat exchanger, the working fluid passing through a cooling loop to continuously provide cooling to the exhaust gas during operation of the system for treating exhaust gas, the first heat exchanger being a part of the cooling loop;

a second heat exchanger positioned downstream of the first heat exchanger and being in fluid communication with the first heat exchanger, the second heat exchanger adapted and configured to remove heat from the working fluid gained at the first heat exchanger, the second heat exchanger being a part of the cooling loop; and a pump positioned downstream of the second heat exchanger and being in fluid communication with the second heat exchanger, the pump adapted and configured to drive the working fluid through the cooling loop, the pump being a part of the cooling loop;

the first heat exchanger, the second heat exchanger, and the pump constitute a first cooling loop adapted and configured to cool exhaust gas within the exhaust gas discharge structure prior to the catalytic exhaust gas treatment device to a predetermined temperature setpoint using the working fluid, and wherein the system further comprises a second, at least partially, independent cooling loop comprising:

a separate first heat exchanger positioned at least partially within the exhaust gas discharge structure and upstream of a second catalytic exhaust gas treatment device, the second catalytic exhaust gas treatment device positioned downstream of the first catalytic exhaust gas treatment device, the separate first heat exchanger adapted and configured to remove heat from an exhaust gas passing through the exhaust gas discharge structure by transferring heat to a working fluid passing through and within the separate first heat exchanger;

a separate second heat exchanger positioned downstream of the separate first heat exchanger adapted and configured to remove heat from the working fluid gained at the separate first heat exchanger; and a separate pump positioned downstream of the second heat exchanger, the separate pump adapted and configured to drive the working fluid through the cooling loop.

25. The system of claim 24, wherein the first cooling loop and the second cooling loop utilize a shared working fluid that is capable of passing between the first cooling loop and the second cooling loop.

26. The system of claim 24, wherein the first cooling loop and the second cooling loop are isolated such that the first and second cooling loops do not share working fluid.

27. The system of claim 24, wherein the second cooling loop is adapted and configured to control the temperature of the exhaust gas at the second catalytic exhaust gas treatment device independently of the first cooling loop.

28. The system of claim 24, wherein the system further includes a third independent cooling loop comprising:

a separate first heat exchanger positioned at least partially within the exhaust gas discharge structure and upstream of a second catalytic exhaust gas treatment device, the second catalytic exhaust gas treatment device positioned downstream of the first catalytic exhaust gas treatment device, the separate first heat exchanger adapted and configured to remove heat from an exhaust gas passing through the exhaust gas discharge structure by transferring heat to a working fluid passing through and within the separate first heat exchanger;

a separate second heat exchanger positioned downstream of the separate first heat exchanger adapted and configured to remove heat from the working fluid gained at the separate first heat exchanger; and a separate pump positioned downstream of the second heat exchanger, the separate pump adapted and configured to drive the working fluid through the cooling loop.

29. The system of claim 28, wherein the first cooling loop, second cooling loop, and third cooling loop utilize a shared working fluid that is capable of passing between the first, second, and third cooling loops.

30. The system of claim 28, wherein the first cooling loop, the second cooling loop, and the third cooling loop are isolated such that the first, second, and third cooling loops do not share working fluid.

31. The system of claim 28, wherein the third cooling loop is adapted and configured to control the temperature of the exhaust gas at the third catalytic exhaust gas treatment device independently of the first cooling loop and independently of the second cooling loop.

32. The system of claim 2, wherein any of the catalytic exhaust gas treatment devices treats exhaust gas without utilizing a catalyst and operates as a non-catalyst treatment system or utilizing a catalyst in combination with a non-catalyst treatment system.

33. The system of claim 32, wherein the non-catalyst treatment system comprises one or more of a capture and/or sequestration system, a membrane adapted and configured to remove targeted gas species from the exhaust gas, or a urea injection system.

34. The system of claim 23 further comprising:

a third catalytic exhaust gas treatment device positioned at least partially within the exhaust gas discharge structure and downstream of the second catalytic exhaust gas treatment device, the third catalytic exhaust gas treatment device adapted and configured to treat at least one component of the exhaust gas through a catalytic reaction between a catalyst contained within the third catalytic exhaust gas treatment device and the at least one component of the exhaust gas; and a sixth heat exchanger, the sixth heat exchanger positioned at least partially within the exhaust gas discharge structure downstream of the second catalytic exhaust gas treatment device, and upstream of the third catalytic exhaust gas treatment device, the sixth heat exchanger adapted and configured to remove heat from an exhaust gas passing through the exhaust gas discharge structure by transferring heat to the working fluid passing through and within the sixth heat exchanger, wherein the sixth heat exchanger is positioned within the cooling loop downstream of the pump and upstream of the second heat exchanger.

35. A method for treating turbine exhaust gas comprising:

receiving exhaust gas from an industrial process turbine at an exhaust gas discharge structure and passing the exhaust gas through the exhaust gas discharge structure;

removing heat from the exhaust gas passing through the exhaust gas discharge structure using a first heat exchanger positioned at least partially within the exhaust gas discharge structure and upstream of a first catalytic exhaust gas treatment device by transferring heat to a working fluid passing through and within the first heat exchanger;

passing the working fluid through a cooling loop to continuously provide cooling to the exhaust gas during treatment of the exhaust gas, the first heat exchanger being a part of the cooling loop;

treating at least one component of the exhaust gas using the first catalytic exhaust gas treatment device positioned at least partially within the exhaust gas discharge structure, the first catalytic exhaust gas treatment device adapted and configured to treat at least one component of the exhaust gas through a catalytic reaction between a catalyst contained within the first catalytic exhaust gas treatment device and the at least one component of the exhaust gas;

removing heat from the working fluid gained at the first heat exchanger using a second heat exchanger in fluid communication with the first heat exchanger, the second heat exchanger being a part of the cooling loop outside the exhaust gas discharge structure and outside the exhaust gas passing through the exhaust gas discharge structure; and driving the working fluid using a pump positioned downstream of the second heat exchanger and being in fluid communication with the second heat exchanger, the pump adapted and configured to drive the working fluid through the cooling loop, and the pump being a part of the cooling loop.

36. The method of claim 35 further comprising treating, using a second catalytic exhaust gas treatment device, at least one component of the turbine exhaust gas through a catalytic reaction between a catalyst contained within the second catalytic exhaust gas treatment device and the at least one component of the exhaust gas, the second catalytic exhaust gas treatment device positioned at least partially within the exhaust gas discharge structure and downstream of the first catalytic exhaust gas treatment device.

37. The method of claim 36 further comprising treating the exhaust gas using the first catalytic exhaust treatment device within a first temperature range and treating the exhaust gas using the second catalytic exhaust treatment device within a second temperature range, wherein an upper bound of the first temperature range is higher than an upper bound of the second temperature range.

38. The method of claim 36 further comprising removing heat from the working fluid using a third heat exchanger, the third heat exchanger positioned downstream of the pump, wherein the third heat exchanger is adapted and configured to transfer heat to atmosphere by a fan capable of passing air over the third heat exchanger.

39. The method of claim 38 further comprising removing heat from the exhaust gas passing through the exhaust gas discharge structure using a fourth heat exchanger and transferring heat to the working fluid passing through and within the fourth heat exchanger, the fourth heat exchanger positioned at least partially within the exhaust gas discharge structure downstream of the first catalytic exhaust gas treatment device and upstream of the second catalytic exhaust gas treatment device, and wherein the fourth heat exchanger is positioned within the cooling loop downstream of the pump and upstream of the second heat exchanger.

40. The method of claim 39, wherein the first heat exchanger and the fourth heat exchanger are arranged in parallel loops such that the working fluid is split with separate portions of the working fluid passing through the first heat exchanger and the fourth heat exchanger, the separate portions of the working fluid converging to form a single flow after exiting the first heat exchanger and the fourth heat exchanger.

41. The method of claim 39, wherein the first heat exchanger and the fourth heat exchanger are arranged to be fed by the working fluid in series, the working fluid not being split between the first and fourth heat exchangers.

* * * * *